United States Patent
Hicken et al.

(10) Patent No.: US 10,079,856 B2
(45) Date of Patent: *Sep. 18, 2018

(54) ROTATION OF WEB SITE CONTENT TO PREVENT E-MAIL SPAM/PHISHING ATTACKS

(71) Applicant: International Business Machines Corporation, Armonk, NY (US)

(72) Inventors: George Hicken, Southampton (GB); Adam Pilkington, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/831,863

(22) Filed: Aug. 20, 2015

(65) Prior Publication Data

US 2015/0365434 A1  Dec. 17, 2015

Related U.S. Application Data

(60) Continuation of application No. 13/406,733, filed on Feb. 28, 2012, now Pat. No. 9,148,444, which is a division of application No. 13/117,062, filed on May 26, 2011, now Pat. No. 8,800,033.

(51) Int. Cl.
    *H04L 29/06* (2006.01)
(52) U.S. Cl.
    CPC ............................. *H04L 63/1483* (2013.01)
(58) Field of Classification Search
    CPC . H04L 63/08; H04L 63/1483; H04L 63/1416; H04L 63/1433; G06F 21/564
    USPC .......... 726/3, 22; 713/168, 175; 709/9, 224; 715/530
    See application file for complete search history.

(56) References Cited

U.S. PATENT DOCUMENTS

| | | | | |
|---|---|---|---|---|
| 7,526,730 B1* | 4/2009 | Cahill | ............... | G06F 17/30905 715/738 |
| 8,156,559 B2* | 4/2012 | Chen | .................. | G06F 11/3608 713/187 |
| 8,650,614 B2* | 2/2014 | Nahari | .................. | G06F 21/554 713/168 |
| 8,887,245 B1* | 11/2014 | Wiltzius | .............. | H04L 63/1433 726/25 |
| 8,904,279 B1* | 12/2014 | Bougon | .................. | H04L 67/02 705/51 |

(Continued)

*Primary Examiner* — Abu Sholeman
(74) *Attorney, Agent, or Firm* — Steven M. Greenberg, Esq.; CRGO Law

(57) ABSTRACT

Embodiments of the invention provide a method, system and computer program product for phishing attack management through Web site content rotation. In an embodiment of the invention, a method for phishing attack management through Web site content rotation is provided. The method includes receiving a request for a variation of a component to be incorporated into a Web page from a requesting Web page rendering engine from over a computer communications network. The method also includes comparing the requested variation of the component to a currently configured variation of the component. Finally, the method includes returning both the requested variation of the component and an alert indicating a possible phishing attack in response to the request if the requested variation of the component differs from the currently configured variation of the component.

21 Claims, 1 Drawing Sheet

(56) References Cited

U.S. PATENT DOCUMENTS

| | | | | |
|---|---|---|---|---|
| 9,058,490 B1* | 6/2015 | Barker | G06F 21/564 | |
| 9,317,616 B1* | 4/2016 | Yates | H04L 67/142 | |
| 2005/0240869 A1* | 10/2005 | Leetaru | G06F 17/24 | |
| | | | | 715/234 |
| 2007/0105564 A1* | 5/2007 | Harris | H04W 68/00 | |
| | | | | 455/453 |
| 2007/0118528 A1* | 5/2007 | Choi | H04L 51/12 | |
| 2007/0130318 A1* | 6/2007 | Roast | G06Q 10/10 | |
| | | | | 709/224 |
| 2008/0005117 A1* | 1/2008 | Yulo | H04L 67/02 | |
| 2009/0328208 A1* | 12/2009 | Peters | G06F 21/51 | |
| | | | | 726/22 |
| 2010/0043071 A1* | 2/2010 | Wang | G06F 21/51 | |
| | | | | 726/22 |
| 2010/0100958 A1* | 4/2010 | Jeremiah | G06F 21/36 | |
| | | | | 726/22 |
| 2010/0217989 A1* | 8/2010 | Sauve | H04L 63/126 | |
| | | | | 713/175 |
| 2011/0060727 A1* | 3/2011 | Koul | H04L 67/02 | |
| | | | | 707/689 |
| 2011/0276863 A1* | 11/2011 | Bhise | G06F 17/30905 | |
| | | | | 715/201 |
| 2012/0030197 A1* | 2/2012 | Attias | G06Q 30/02 | |
| | | | | 707/723 |
| 2012/0084835 A1* | 4/2012 | Thomas | G06F 17/30867 | |
| | | | | 726/3 |
| 2013/0124856 A1* | 5/2013 | Agrawal | H04L 63/10 | |
| | | | | 713/156 |
| 2015/0067786 A1* | 3/2015 | Fiske | H04L 63/08 | |
| | | | | 726/4 |
| 2017/0264591 A1* | 9/2017 | Roberts | G06Q 30/0277 | |
| 2017/0331848 A1* | 11/2017 | Alsaleh | H04L 63/1483 | |

* cited by examiner

ROTATION OF WEB SITE CONTENT TO PREVENT E-MAIL SPAM/PHISHING ATTACKS

CROSS-REFRENCE TO RELATED APPLICATION

This application is a Continuation of U.S. application Ser. No. 13/406,733, filed Feb. 28, 2012, now allowed, which is a Divisional of U.S. application Ser. No. 13/117,062, filed May 26, 2011, now U.S. Pat. No. 8,800,033, the entirety of which are incorporated herein by reference.

BACKGROUND OF THE INVENTION

Field of the Invention

The present invention relates to network security and more particularly to phishing attack management.

Description of the Related Art

The terms "phishing" and "brand spoofing" refer to the transmission of an e-mail to a user falsely claiming to be an established legitimate enterprise in an attempt to scam the user into surrendering private information that will be used for identity theft. In a phishing scam, an e-mail appearing to originate from the legitimate enterprise (whether by the inclusion of a well-known icon or logo, or domain name) directs the user to visit a Web site where the users will be asked to update personal information, such as a password, credit card number, social security number, or bank account number. The Web site, however, merely is an imposter site masquerading for the legitimate Web site for the legitimate enterprise. For the unsuspecting user, valuable confidential information will be revealed to the fraudster.

Government experts and technical experts alike recommend vigilance as a prime means of combating the phishing scheme. Specifically, experts recommend that end users never reveal private information through a Web site in response to receiving an e-mail requesting the private information, no matter how legitimate the e-mail appears. Rather, experts encourage recipients of such e-mails to directly phone the legitimate enterprise through a previously known telephone number to inquire as to the legitimacy of the e-mail. Even still, many users simply lapse in caution and unwittingly participate as victims in the phishing scam.

BRIEF SUMMARY OF THE INVENTION

Embodiments of the present invention address deficiencies of the art in respect to phishing attack management and provide a novel and non-obvious method, system and computer program product for phishing attack management through Web site content rotation. In an embodiment of the invention, a method for phishing attack management through Web site content rotation is provided. The method includes receiving a request from over a computer communications network for a variation of a component to be incorporated into Web page content from a requesting Web page rendering engine such as a Web browser or e-mail client configured to render Web page content. The method also includes comparing the requested variation of the component to a currently configured variation of the component. Finally, the method includes returning both the requested variation of the component and an alert indicating a possible phishing attack in response to the request if the requested variation of the component differs from the currently configured variation of the component.

In one aspect of the embodiment, comparing the requested variation of the component to a currently configured variation of the component includes comparing a uniform resource locator (URL) of the requested variation of the component to a URL of the currently configured variation of the component. In another aspect of the embodiment, returning both the requested variation of the component and an alert indicating a possible phishing attack in response to the request if the requested variation of the component differs from the currently configured variation of the component, includes returning both the requested variation of the component and a visual alert superimposed over the requested variation of the component indicating a possible phishing attack in response to the request if the requested variation of the component differs from the currently configured variation of the component.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for phishing attack management through Web site content rotation. In accordance with an embodiment of the invention, a set of different variations of a Web site component of a page of a Web site can be provided and the page of the Web site can be configured to retrieve and incorporate only a single one of the variations of the Web site component. Periodically, the page of the configuration of the page of the Web site can be updated to retrieve and incorporate a different one of the variations of the Web site component from the set. Responsive to receiving a request for the Web site component from a page of the Web site that specifies the retrieval and incorporation of a variation of the Web site component, yet that differs from a variation of the Web site component specified by the configuration of the page of the Web site, a warning message can be provided in association with the page of the Web site. In this way, a viewer of the page of Web site can be alerted to a potential phishing attack.

Figure 1:
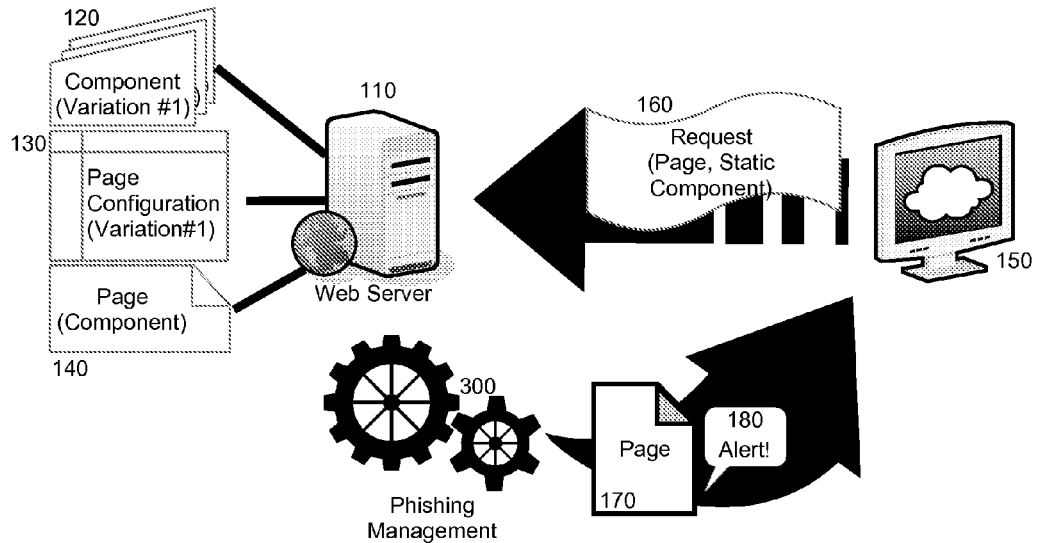
FIG. 1 is a pictorial illustration of a process for phishing attack management through Web site content rotation.

In further illustration, FIG. 1 pictorially shows a process for phishing attack management through Web site content rotation. As shown in FIG. 1, a Web page 140 of a Web site can be provided. One of different variations 120 of a component can be incorporated into the Web page 140, for example a menu bar or tool bar. Different ones of the variations 120 of the component can be incorporated into the Web page 140, but only one of the variations 120 of the component can be incorporated into the Web page 140 at any one time. A configuration 130 for the Web page 140 can be maintained to indicate the one of the variations 120 of the component incorporated into the Web page 140 at any one time, and can be maintained, for example, by way of a URL of the one of the variations 120 of the component incorporated into the Web page 140.

A Web server 110 can receive a request 160 for the delivery of one of the variations 120 of the component in connection with the rendering of a form 170 of the Web page 140 by a rendering engine such as that found in an e-mail client or Web browser in a client computing device 150. Phishing management 300 process can compare the request 160 for the delivery of one of the variations 120 of the component with the configuration 130 to determine if the currently selected one of the variations 120 of the component is the same as the requested one of the variations 120. If not, the requested one of the variations 120 can be served in response to the request 160 to the client computing device 150 with an alert 180 for inclusion in the form 170 of the Web page 140 indicating the possibility that a phishing attack has occurred.

Figure 2:
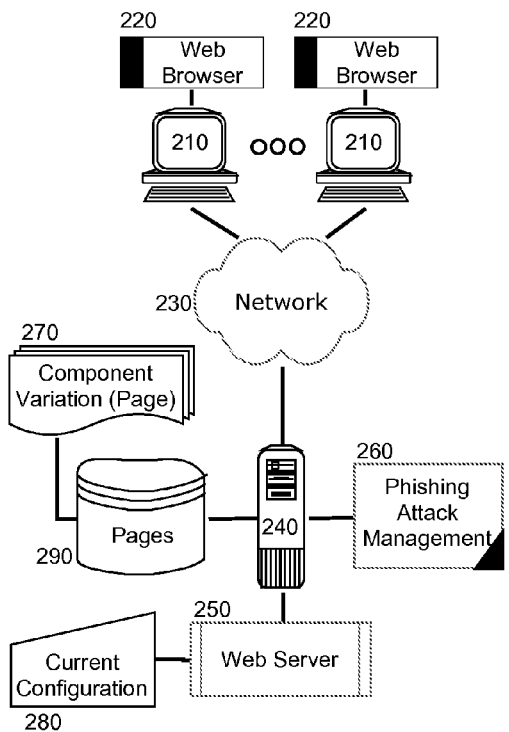
FIG. 2 is a schematic illustration of a Web site content data processing system configured for phishing attack management through content rotation; and, FIG. 3 is a flow chart illustrating a process for phishing attack management through Web site content rotation.

The process described in connection with FIG. 1 can be implemented in a Web site content data processing system. To that end, FIG. 2 is a schematic illustration of a Web site content data processing system configured for phishing attack management through content rotation. The system can include a host computer 240 with at least one processor and memory configured for communicative coupling to different client computers 210 over a computer communications network 230, each of the client computers 210 being configured with a Web browser 220. The host computer 240 can include a Web server 250 serving different Web pages 290 to requesting ones of the Web browsers 220.

One of the pages 290 can incorporate a variation amongst multiple different variations of a component 270, such as a tool bar or menu bar. A current configuration 280 for the one of the pages 290 can indicate which of the variations of the components 270 is to be incorporated with every service of the one of the pages 290 to a requesting one of the Web browsers 220. Of import, phishing attack management module 260 can execute in the memory of the host computer 240. The module 260 can include program code enabled to compare a request for one of the variations of the component 270 for the one of the pages 290 to a variation of the component 270 set forth in the current configuration 280 for the one of the pages 290. In response to a dis-favorable comparison, the program code of the module 260 can be enabled to return an alert in conjunction with the requested one of the variations of the component 270 that the one of the pages 290 possibly represents a phishing attack.

Alternatively, the phishing attack management module 260 can include program code enabled to periodically change a reference in the one of the pages 290, such as an embedded file name, to a valid variation of the component 270 while superimposing upon or otherwise modifying other variations of the component 270 to include the alert. In this way, a contemporaneous request to the one of the pages 290 always will return the correct variation of the component 270 without the alert, but a version of the one of the pages 290 that is outdated and includes a reference to the incorrect variation of the component will return the alert indicating that the one of the pages 290 possibly represents a phishing attack without requiring the maintenance of a current configuration 280 for the one of the pages 290.

Figure 3:
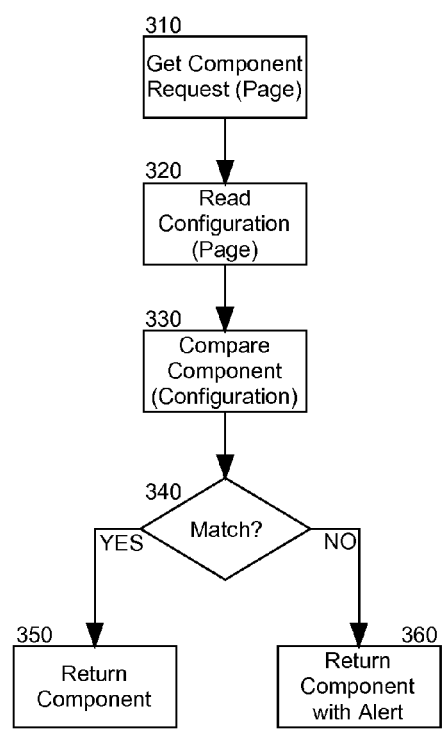

In even yet further illustration of the operation of the phishing attack management module 260, FIG. 3 is a flow chart illustrating a process for phishing attack management through Web site content rotation. Beginning in block 310, a component request can be received for a corresponding Web page. In block 320, a configuration for the corresponding Web page can be read to identify a currently incorporated variation of the component. In block 330 the currently incorporated variation of the component can be compared to the requested component—for instance by comparing the URL for each. In decision block 340, if the currently incorporated variation of the component matches the requested component, in block 350 the requested variation of the component can be returned to the requesting process. However, in decision block 340, if the currently incorporated variation of the component does not match the requested component, in block 360 the requested variation of the component can be returned to the requesting process along with an alert indicating a possibility that a phishing attack has occurred.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:
1. A computer system comprising:
   at least one processor;
   memory; and
   a server module including a phishing attack management module, the server module including program code that, when executed in the memory of the host computer, causes the processor(s) to:
   store a multiplicity of visual component variations, with at least one of the visual component variations not including a visual representation indicating an alert;
   intermittently re-assign one of the visual component variations as the currently-assigned visual component variation;
   receive a request for a web page component from the web page of the Web site that specifies a retrieval and incorporation of one of the visual component variations, yet that differs from the currently-assigned visual component variation for the web page;
   responsive to the request, determine if the request specifies a retrieval and incorporation of one of the visual component variations that differs from a variation of the component set forth in a current configuration for the web page;

on condition that the request is determined to specify a retrieval and incorporation of one of the visual component variations that does not differ from a variation of the component set forth in a current configuration for the the web page, returning the web page with the currently-assigned visual component variation of the visual component variations, but otherwise on condition that the request specifies a retrieval and incorporation of one of the visual component variations that differs from a variation of the component set forth in a current configuration for the the web page, return the web page with a visual component variation of the visual component variations that includes a visual representation indicating an alert.

2. The system of claim 1, wherein the determination is based, at least in part, upon an identity of the currently-assigned visual component variation.

3. The system of claim 1, wherein the return of the web page with the visual component variation of the visual component variations that includes a visual representation indicating an alert manages a suspected phishing attack.

4. The system of claim 1, wherein the is based upon a comparison of a uniform resource locator (URL) of the request to a URL of a current variation of the web page.

5. The system of claim 1, wherein each of the visual components is a tool bar for the web page.

6. The system of claim 1, wherein each of the visual components is a menu bar for the web page.

7. The system of claim 1, wherein the alert is a warning message.

8. A method phishing attack management through Web site content rotation comprising:
   storing a multiplicity of visual component variations for a web page, with at least one of the visual component variations not including a visual representation indicating an alert;
   intermittently re-assigning one of the visual component variations as the currently-assigned visual component variation;
   receiving a request for the web page component from the web page of the Web site that specifies a retrieval and incorporation of one of the visual component variations, yet that differs from the currently-assigned visual component variation for the web page;
   responsive to the request, determining if the request specifies a retrieval and incorporation of one of the visual component variations that differs from a variation of the component set forth in a current configuration for the the web page; and
   on condition that the request is determined to specify a retrieval and incorporation of one of the visual component variations that does not differ from a variation of the component set forth in a current configuration for the the web page, returning the web page with the currently-assigned visual component variation of the visual component variations, but otherwise on condition that the request specifies a retrieval and incorporation of one of the visual component variations that differs from a variation of the component set forth in a current configuration for the web page, returning the web page with that a visual component variation of the visual component variations includes a visual representation indicating an alert.

9. The method of claim 8, wherein the determination is based, at least in part, upon an identity of the currently-assigned visual component variation.

10. The method of claim 8, wherein the return of the web page with the visual component variation of the visual component variations that includes a visual representation indicating an alert manages a suspected phishing attack.

11. The method of claim 8, wherein the is based upon a comparison of a uniform resource locator (URL) of the request to a URL of a current variation of the web page.

12. The method of claim 8, wherein each of the visual components is a tool bar for the web page.

13. The method of claim 8, wherein each of the visual components is a menu bar for the web page.

14. The method of claim 8, wherein the alert is a warning message.

15. A computer program product for phishing attack management through Web site content rotation, the computer program product for comprising:
   a non-transitory computer readable storage medium having computer readable program code embodied therewith, the computer readable program code comprising:
   computer readable program code for:
   storing a multiplicity of visual component variations for a web page, with at least one of the visual component variations not including a visual representation indicating an alert;
   intermittently re-assigning one of the visual component variations as the currently-assigned visual component variation;
   receiving a request for the web page component from the web page of the Web site that specifies a retrieval and incorporation of one of the visual component variations, yet that differs from the currently-assigned visual component variation for the web page;
   responsive to the request, determining if the request specifies a retrieval and incorporation of one of the visual component variations that differs from a variation of the component set forth in a current configuration for the the web page; and
   on condition that the request is determined to specify a retrieval and incorporation of one of the visual component variations that does not differ from a variation of the component set forth in a current configuration for the the web page, returning the web page with the currently-assigned visual component variation of the visual component variations, but otherwise on condition that the request specifies a retrieval and incorporation of one of the visual component variations that differs from a variation of the component set forth in a current configuration for the web page, returning the web page with a visual component variation of the visual component variations that includes a visual representation indicating an alert.

16. The computer program product of claim 15, wherein the determination is based, at least in part, upon an identity of the currently-assigned visual component variation.

17. The computer program product of claim 15, wherein the return of the web page with the visual component variation of the visual component variations that includes a visual representation indicating an alert manages a suspected phishing attack.

18. The computer program product of claim 15, wherein the is based upon a comparison of a uniform resource locator (URL) of the request to a URL of a current variation of the web page.

19. The computer program product of claim 15, wherein each of the visual components is a tool bar for the web page.

20. The computer program product of claim 15, wherein each of the visual components is a menu bar for the web page.

21. The computer program product of claim 15, wherein the alert is a warning message.

\* \* \* \* \*